(12) United States Patent
Wenn et al.

(10) Patent No.: US 8,515,923 B2
(45) Date of Patent: Aug. 20, 2013

(54) ORGANIZATIONAL USAGE DOCUMENT MANAGEMENT SYSTEM

(75) Inventors: John C Wenn, Redondo Beach, CA (US); Daniel W Manchala, Torrance, CA (US); Leonid Orlov, Hermosa Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1577 days.

(21) Appl. No.: 11/695,418

(22) Filed: Apr. 2, 2007

(65) Prior Publication Data
US 2007/0174347 A1 Jul. 26, 2007

Related U.S. Application Data

(63) Continuation-in-part of application No. 10/868,155, filed on Jun. 15, 2004, now abandoned.

(60) Provisional application No. 60/520,686, filed on Nov. 17, 2003.

(51) Int. Cl.
*G06F 17/30* (2006.01)

(52) U.S. Cl.
USPC ........... 707/694; 707/609; 707/634; 707/672; 707/695; 707/781; 707/784; 707/785; 715/200; 715/209; 715/213; 715/229; 715/230

(58) Field of Classification Search
USPC ................. 707/609, 634, 672, 694–695, 781, 707/784–785; 715/200, 209, 213, 229, 230
See application file for complete search history.

(56) References Cited

U.S. PATENT DOCUMENTS

| 4,035,778 | A | * | 7/1977 | Ghanem | 711/133 |
|---|---|---|---|---|---|
| 5,297,265 | A | * | 3/1994 | Frank et al. | 711/202 |
| 5,379,422 | A | * | 1/1995 | Antoshenkov | 707/1 |
| 6,185,576 | B1 | * | 2/2001 | McIntosh | 707/200 |
| 6,260,044 | B1 | * | 7/2001 | Nagral et al. | 707/102 |
| 6,851,030 | B2 | * | 2/2005 | Tremaine | 711/160 |
| 7,362,458 | B2 | * | 4/2008 | Adachi | 358/1.15 |
| 7,421,499 | B1 | * | 9/2008 | Lanahan et al. | 709/226 |
| 2001/0015817 | A1 | * | 8/2001 | Adachi | 358/1.13 |
| 2002/0083079 | A1 | * | 6/2002 | Meier et al. | 707/104.1 |
| 2003/0130993 | A1 | * | 7/2003 | Mendelevitch et al. | 707/3 |
| 2005/0108260 | A1 | | 5/2005 | Wenn et al. | |
| 2008/0294780 | A1 | * | 11/2008 | Lanahan et al. | 709/226 |

* cited by examiner

*Primary Examiner* — Frantz Coby
(74) *Attorney, Agent, or Firm* — Gibb & Riley, LLC

(57) ABSTRACT

A document repository management system for an institution having a defined organization is provided. The document repository management system has (a) a first database containing an organization chart and organizational chart information including information identifying individuals in the defined organization, (b) a second database containing accessible documents, (c) programs for controlling requested access to each document of the accessible documents in the second database, and (d) programs for mapping, to the organization chart and the organizational chart information of the first database, each requested access to each document of the accessible documents, thereby enabling efficient management of the document repository based on historical tracking of actual usage of each document by individuals and groups on the organization chart.

30 Claims, 5 Drawing Sheets

10

14
12

(A) YOUR NAME [                    ]
    YOUR ORGANIZATION/GROUP [       ▼]
    YOUR ID [                    ]

16
(B) DOCUMENT TYPE [              ▼]
    CODE [                    ]

18
(C) ☐ AUTHORIZATION TOKEN    ENTER A-CODE [    ]
       CODE REQUIRED

20
(D) DESIRED      ◉ READ ON SCREEN
    TREATMENT   ◉ SEND TO
                ◉ EDIT  ☐ ENTER E-A CODE [    ]

DATE: [      ▼]
TIME: [    ]                    [ SUBMIT ]

◉ ACCEPTED   ◉ DENIED

*FIG. 2*

ORGANIZATIONAL USAGE DOCUMENT MANAGEMENT SYSTEM

This application is a Continuation-in-part of U.S. patent application Ser. No. 10/868,155, filed Jun. 15, 2004, abandoned on Jul. 23, 2007, which was based on U.S. Provisiional Patent Application No. 60/520,686, filed Nov. 17, 2003.

The present invention relates to records management systems and, more particularly to a record or document management system that monitors and tracks document usage history in relation to the users' organizational structures as represented on its organization charts.

Businesses and institutions such as those in Government, healthcare service, financial service, legal service, and the like, each has a structured organization, and are constantly generating, storing and using an ever increasing volume of records or documents, which today are more and more electronic in form. Such records or documents must be managed properly in order to derive their full value. Such management is usually in accordance with legal, and a record retention program, requirements. The entire process usually is costly.

Within each business or institution, proper records management may include decisions as to which records or documents to continue to generate, which to store on-site or off-site, which to discontinue, which to destroy, which to retain beyond the normal retention program guidelines. There may be further interest and value in keeping track of which individuals and job positions within groups or departments of an organization as shown on their organization chart are accessing which documents and in what manner.

There is therefore a need for a record or document management system that monitors and tracks document usage history in relation to the users' organizational structure, such as the users' organization charts.

In accordance with the present disclosure, there is provided a document repository management system for an institution having a defined organization. The document repository management system has (a) a first database containing an organization chart and organizational chart information including information identifying individuals in the defined organization, (b) a second database containing accessible documents, (c) programs for controlling requested access to each document of the accessible documents in the second database, and (d) programs for mapping, to the organization chart and the organizational chart information of the first database, each requested access to each document of the accessible documents, thereby enabling efficient management of the document repository based on historical tracking of actual usage of each document by individuals and groups on the organization chart.

In the detailed description of the disclosure presented below, reference is made to the drawings, in which:

FIG. 2 is an exemplary document access request form;

While the present disclosure will be described in connection with a preferred embodiment thereof, it will be understood that it is not intended to limit the disclosure to that embodiment. On the contrary, it is intended to cover all alternatives, modifications, and equivalents as may be included within the spirit and scope of the disclosure as defined by the appended claims.

Figure 1:
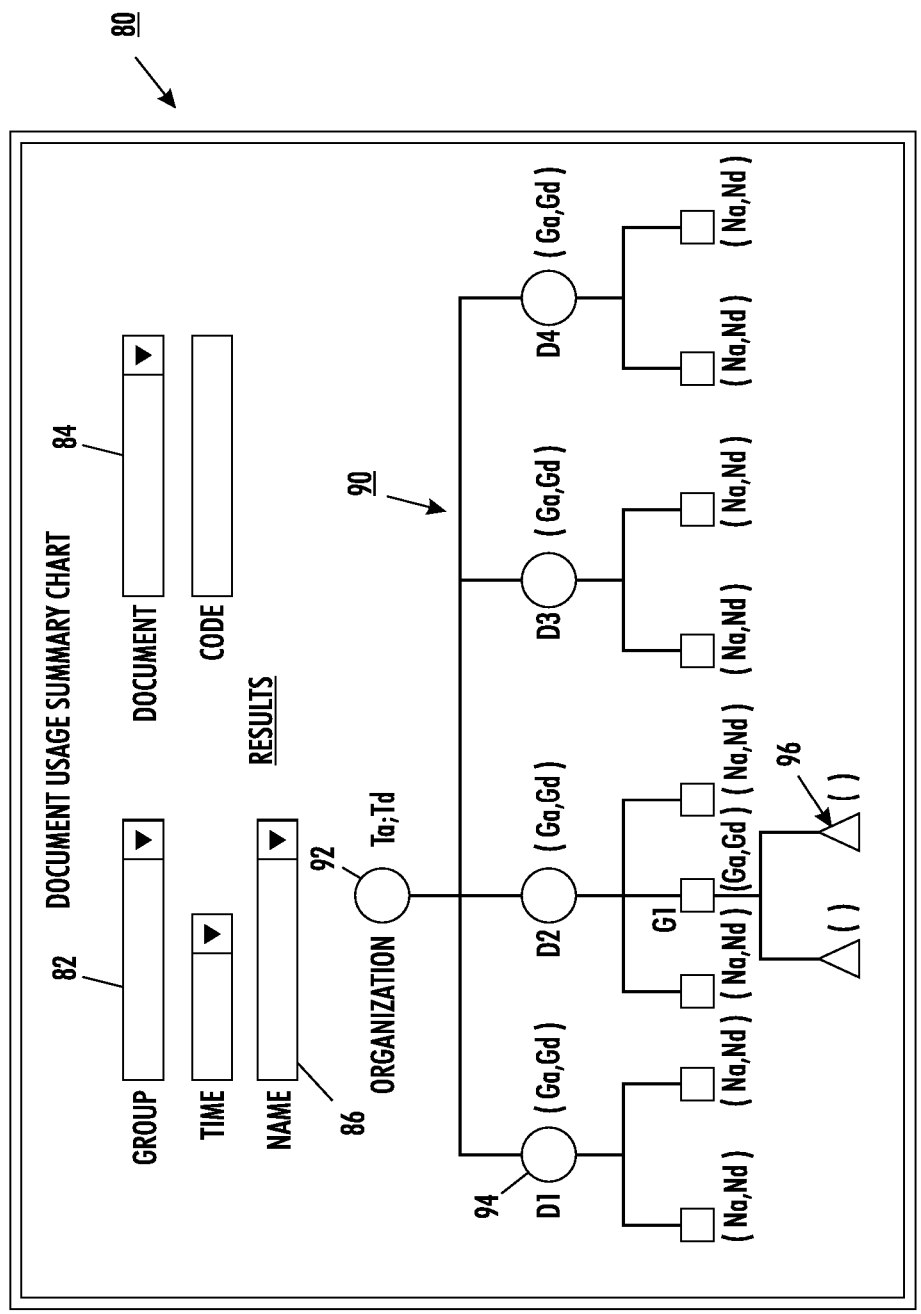
FIG. 1 is an is illustration of a document usage summary document for a defined organization showing an organization chart having a department level, a group level and individual levels, each with usage data.
Figure 5:
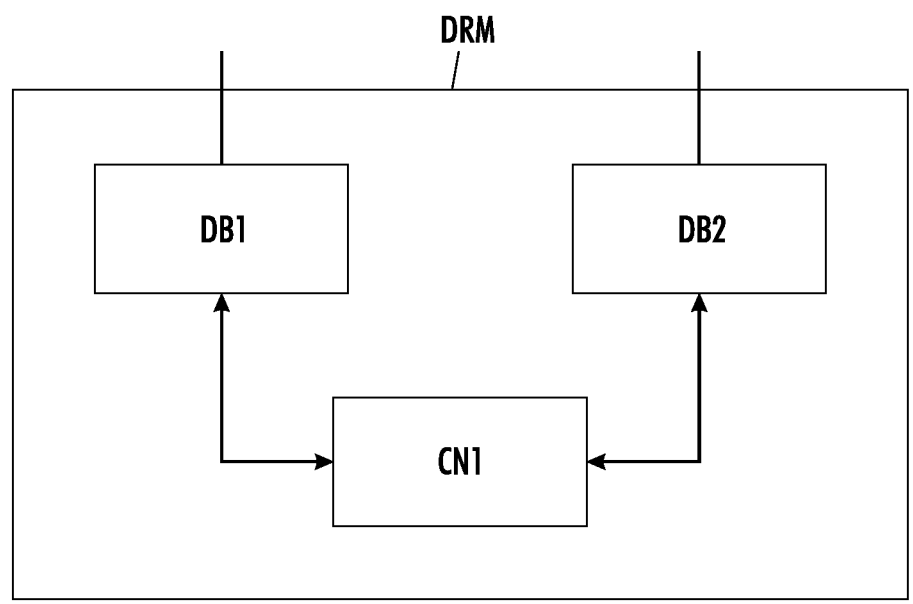
FIG. 5 is a block diagram illustration of the document repository management system of the present invention.

Referring first to FIGS. 5 and 1, the document repository management (DRM) system for an institution having a defined organization is illustrated. As shown, the DRM system includes (a) a first database DB1, (b) a second database DB2 and a controller CN1. The first database DB1 contains an organization chart 90 and organizational chart information 91 as shown in FIG. 1. The organization chart 90 as is ordinarily the case, is a pyramid shaped hierarchical graphical arrangements of positions and titles, as well as interrelationships of such positions within the organization. The organization chart information 91 includes information identifying individuals in the defined organization. The second database DB2 contains reposited documents that can be accessed. The controller CN1 includes programs for controlling requested access to each document of the accessible documents in the second database DB2, and programs for mapping each requested access to each document of the accessible documents to the organization chart and the organizational chart information of the first database DB1, thereby enabling efficient management of the document repository based on historical tracking of actual usage of each document by individuals and groups on the organization chart.

Referring next to FIG. 2, there is illustrated an exemplary document access request (DAR) form, such as an electronic form, 10 on which an individual (in a group within an organization) wishing to access a particular document is required to input information 12. As illustrated, the DAR form 10 includes a personal information section 14 for inputting information about the person seeking access, a document information section 16 for inputting information about the particular document being accessed. The DAR form 10 also includes an authorization section 18 for inputting access authorization information if needed, a desired treatment selection section 20 for selecting one or more of repository authorized treatments of the particular document, and a final section for recording the date and time for submission and processing of the request, as well as the outcome of the request.

As shown and labeled, the personal information section 14 includes a name field, and organization or group field, and a personal ID or identification code field. The document information section 16 includes a document name or other text descriptor field and a document code field where the requester for example knows the document code or number. As further illustrated, the authorization section 18 is an optional filed, and information therefor is required only in the case of certain documents. The document treatment section 20, for example includes a "read on screen", a "send to" and a pre-authorized "edit" treatment options. When all necessary access request information for a particular document has been entered, it is then submitted for processing, and the date and time is noted. The system then notifies the requester whether the request is accepted or denied. If accept, the document will be produced for opening and treatment per the request terms.

Figure 3:
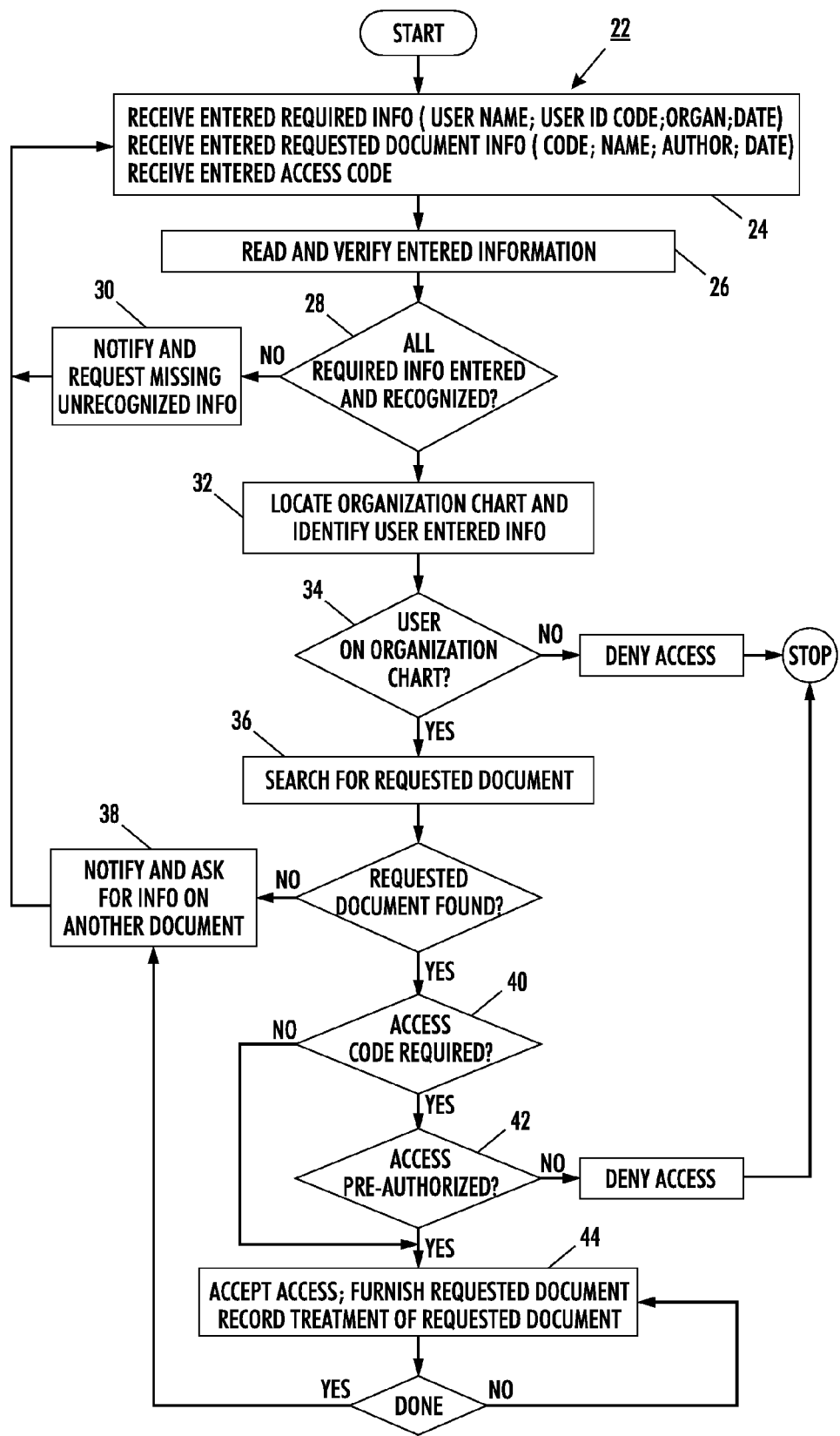
FIG. 3 is a flow chart of the method of the document repository management system.

Referring next to FIG. 3, there is illustrated a flow chart 22 of the method of the document repository management system of the present disclosure. As illustrated and labeled, a system controller (not shown) but as is well known, receives, reads and verifies (at 24-30) the information inputted on the DAR form 10 as above, and requests re-input of missing or unrecognizable information. When all the required input information is recognized, the system at 32 locates in the first database DB1, a defined organization chart 90, as shown in FIG. 1, for the institution and locates the requestor, his group, position and title on the organization chart. If as shown at 34 the requestor is not on the organization chart 90, the document access request is of course denied and the system records the transaction and stops.

If the requester is on the organization chart 90, then the system at 36 seeks the requested document and notifies the requester at 38 if it is not found. If it is found, then an access authorization code must be provided at 40-42 if one is required, or else the access request is denied. If not required, the access request is accepted, the document is furnished and the transaction including the treatment is recorded at 44. Access will be denied where an access authorization code is required but none is provided.

Figure 4:
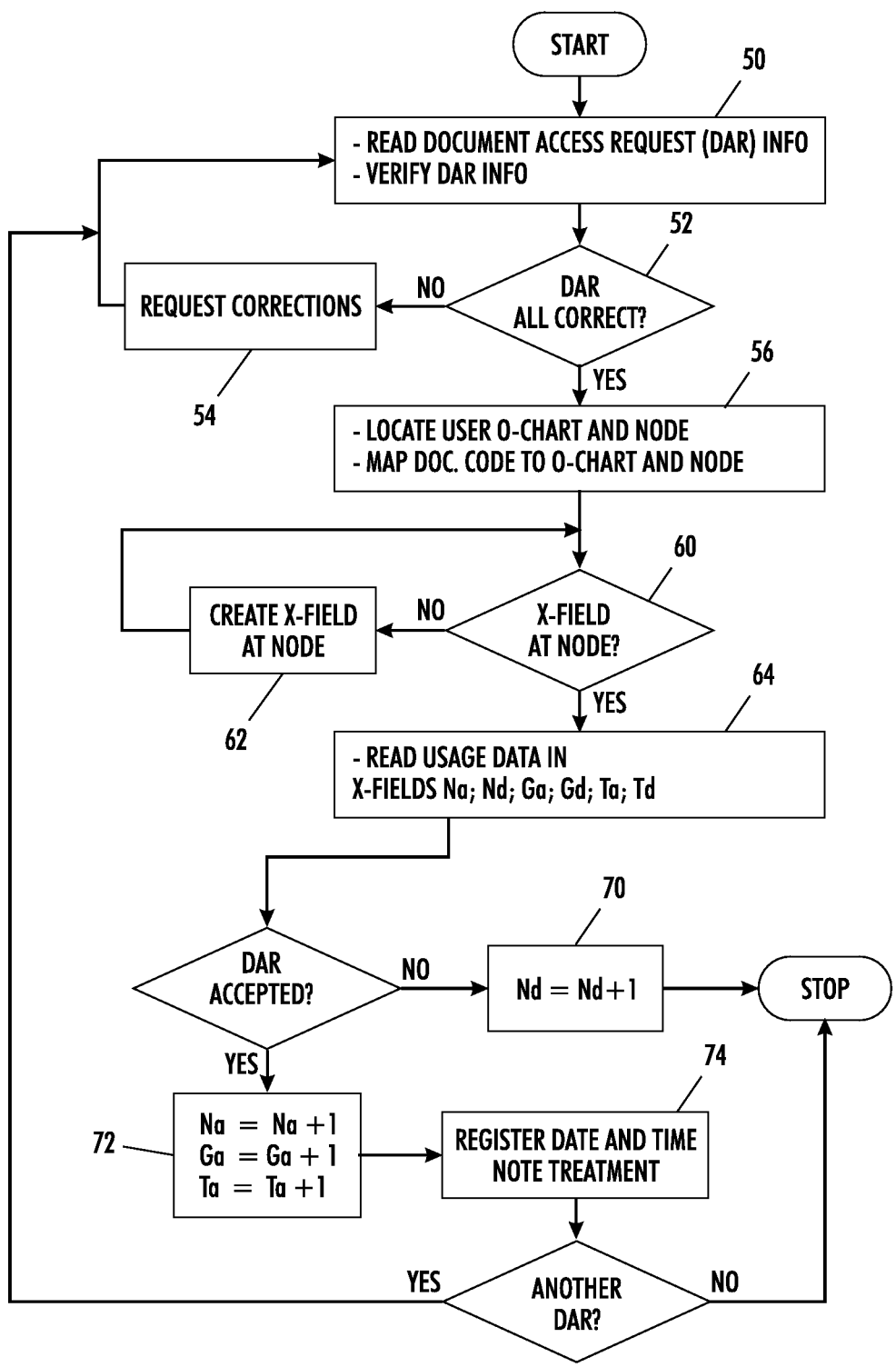
FIG. 4 is a flow chart of the document usage mapping aspect in accordance with the present disclosure.

Document usage and treatment history on the institution's organization chart is illustrated for example in FIGS. 4 and 1. As shown at 50-54, upon receiving and verifying the requestor information as above, the system at 56 locates the organization chart (O-chart) and maps the request transaction to the document code (DOC. Code) and to the particular position or (Node) on the O-chart where the requestor is located. The position and title of the Node and person are recorded. The system at 60-64 then examines the particular Node for a data field (X-field) for recording usage data, including the current data, about the particular document. If no such field exists, then the system creates one for example at 96 (FIG. 1). If the field already exists, it should have for example at least two types of data, for example Na (for number of times a request for that particular document has been accepted), and Nd (for number of times a request for that particular document has been denied).

If the Node is a group level Node, such as 94 (FIG. 1), then the data field will include Ga data (for number of times request for that particular document have been accepted for members of that group), Gd (for number of times requests by members of that group for that particular document have been denied). This pattern of course is repeated at every group or department level until at 92 Ta and Td data (for number of times requests for that particular document by all members of the institution have been accepted or denied respectively).

As shown in FIG. 1, the two types of data can be displayed side by side as illustrated on a document usage summary chart 80 resembling the institution's organization chart. As illustrated, the summary chart 80 has options for selecting the data to be displayed by group at 82, document type or code at 84 or b an individuals name at 86. The data display can be textual, or graphic as illustrated on the organization chart 90.

The displayable data Na, Nd, Ga, Gd and Ta, Td is updated as illustrated in FIG. 4 at 70-74 for each document access request processed by the system.

The system of the present invention thus is directed to an automated creation of a document usage history that is mapped to the organization chart of an institution. Data for such document usage is collected automatically from document access logs of the repository. As described above, a log is kept of all the access requests for the documents each individual on the institutions' organization wishes to track. The access request information includes the requestor ID of the individual, as well as the date and time of the access request. Although conventional document repositories keep such logs, access requests can be anonymous and in particular are not tied to the institutions' organization. Other, ad hoc systems of document distribution (FTP servers, individual web pages) also keep such logs, however they often don't have any ID authentication requirements. Mapping the document access and treatment as above to the institutions' organization chart can enable and empower the repository and institution management to make very informed and precise decisions on how to label or treat particular documents in the depository.

The system of course requires the organization chart to be in an electronically readable form. As such, it can be in any suitable format (LDAP directory, Exchange server mailing lists, etc.) as long as a controller program can understand and work with it. One important requirement is that the requestor's information including ID found in the access log must be directly mapable to the individual's node or position on the electronic organization chart.

The mapping can be generated as part of a document repository interface, or it can be generated by an independent program. The results of the mapped and accumulated data can take several forms, for example, they can be in the form of a variety of textual reports. These can include high level reports giving the overall usage, medium level reports giving usage for every organization, and low level reports detailing each access for each group or department.

Since an organization chart is naturally graphical in nature (a hierarchical series of boxes), it naturally lends itself to an interactive graphical mapping as shown in FIG. 1. Thus given a particular document, an organization chart can display the number of accesses numerically as a number, or graphically as the size of a box or bar (the more accesses, the larger the box or bar). Different types of data can be color coded for differentiation.

Thus according to the present invention, the document repository management (DRM) system for an institution having a defined organization, includes (a) a first database containing organizational chart information including information identifying individuals on the defined organization, and (b) a second database containing accessible documents. The (DRM) system also includes a controller and programs for controlling requested access to each document in the second database, as well as for mapping, to the organizational chart information of the first database, each requested access to the each document. This thereby enables efficient management of the document repository based on historical tracking of actual usage and treatment of each document by individuals and groups within the defined organization.

The organizational chart information at 14 (FIG. 2) and at 82, 86 includes data for forming the graphical chart 80 (FIG. 1) of the defined organization, and for identifying departments, and groups within each department of the defined organization. It may also include information identifying a geographical location for each department or group unit within the defined organization. Importantly, it includes information identifying a title for each individual of the individuals within the defined organization.

The second database at 16 (FIG. 2) and at 84 (FIG. 1) includes metadata (that is data descriptive of each document) on each document of the accessible documents. Such metadata may include document title information, document code information, document authorship information, date of authorship information, and information on date of document reposition.

As illustrated in FIGS. 2 and 3, the programs for controlling access to each document of the accessible documents include a pre-authorization code at 18 for each individual based on membership in the defined organization, based on reporting positions within the defined organization, as well as based on departments, and groups within departments in the defined organization. They also include a pre-authorization code for each individual based on permitted possible treatments of each accessible document.

The programs for mapping document access request to the defined organization chart include routines for identifying, summarizing and tracking each requested access in terms of a name of a pre-authorized individual in the defined organization, as part of a count of all requested accesses for the particular document within each group of individuals in each department, and within each department within the defined organization. They may also include routines for identifying, summarizing and tracking each requested access in terms of locations identified within the organizational chart information of the defined organization, and in terms of positions and titles within the defined organization.

The document repository management system as shown in (FIG. 1) includes capability for displaying graphically or otherwise an organizational chart 90 of the defined organization, and data on requested accesses for each document of the accessible documents. The graphical chart as shown includes different organizational levels such as department levels D1-D4 (FIG. 1) and group levels with each such department level. It may also include title information for each department and group leader position.

In accordance with the present invention, a method of managing documents and records in a document repository of an institution having a defined organization includes (i) maintaining a first database containing organizational chart information including information identifying individuals on the defined organization; (ii) maintaining a second database containing accessible documents; (iii) controlling requested access to each document of the accessible documents in the second database; and (iv) mapping, to the organizational chart information, each the requested access to the each document of the accessible documents, thereby enabling efficient management of the document repository based on historical tracking of actual usage and treatment of each document by individuals and groups within the defined organization.

Maintaining the first database includes for example periodically updating the organizational chart information to reflect changes in any location, position and title information on individuals within the defined organization, and maintaining the second database includes adding and subtracting documents and editing documents and document metadata. Maintaining the second database also includes periodically updating document access pre-authorization based on changes in any location, position and title of individuals within the defined organization.

As can be seen, there has been provided a document repository management system for an institution having a defined organization. The document repository management system has (a) a first database containing an organization chart and organizational chart information including information identifying individuals in the defined organization, (b) a second database containing accessible documents, (c) programs for controlling requested access to each document of the accessible documents in the second database, and (d) programs for mapping, to the organization chart and the organizational chart information of the first database, each requested access to each document of the accessible documents, thereby enabling efficient management of the document repository based on historical tracking of actual usage of each document by individuals and groups on the organization chart.

While the embodiment of the present disclosure disclosed herein is preferred, it will be appreciated from this teaching that various alternative, modifications, variations or improvements therein may be made by those skilled in the art, which are intended to be encompassed by the following claims:

What is claimed is:

1. A document repository management (DRM) system for an institution having a defined organization, said DRM system comprising:

an input device for receiving a document access request;
an electronically readable organization chart and organizational chart information including information identifying individuals on said organization chart;
an electronic document repository containing accessible documents;
a controller that:
controls requested access to each document of said accessible documents in said electronic document repository; and
maps to said electronically readable organization chart and said organizational chart information, each said requested access to said each document of said accessible documents; and
a display device that displays a document usage summary chart history based on historical tracking of actual usage and treatment of each document by individuals and groups on said organization chart.

2. The DRM System of claim 1, wherein said electronic document repository includes selectable document treatments to one of display an accessed document on a screen, send an accessed document to a destination and edit an accessed document.

3. The DRM System of claim 1, wherein said organizational chart information includes information identifying departments within said organization chart.

4. The DRM System of claim 3, wherein said organizational chart information includes information identifying groups within each of said departments.

5. The DRM System of claim 4, wherein said organizational chart information includes information identifying a geographical location for each of one of said groups and departments within said organization chart.

6. The DRM System of claim 1, wherein said organizational chart information includes information identifying a title for individuals within said organization chart.

7. The DRM System of claim 1, wherein said electronic document repository includes metadata on each document of said accessible documents.

8. The DRM System of claim 1, wherein said controller controls access to each document of said accessible documents based on a pre-authorization code for each individual based on membership in said electronically readable organization chart.

9. The DRM System of claim 1, wherein said controller controls access to each of said accessible documents based on a preauthorization code for each individual based on reporting positions within said electronically readable organization chart.

10. The DRM System of claim 1, wherein said controller controls access to each of said accessible documents based on a preauthorization code for each individual on a basis of departments within said electronically readable organization chart.

11. The DRM System of claim 1, wherein said controller controls access to each of said accessible documents based on a preauthorization code for each individual on a basis of groups within departments in said electronically readable organization chart.

12. The DRM System of claim 1, wherein said controller controls access to each of said accessible documents based on a preauthorization code for each individual based on permitted possible treatments of each said accessible document.

13. The DRM System of claim 1, wherein said controller identifies, summarizes and tracks each said requested access in terms of a name of a pre-authorized individual in said electronically readable organization chart.

14. The DRM System of claim 1, wherein said controller identifies, summarizes and tracks each said requested access for a particular document as part of a count of all requested accesses for said particular document within each group of individuals in each department in said electronically readable organization chart.

15. The DRM System of claim 1, wherein said controller identifies, summarizes and tracks each said requested access for a particular document as part of a count of all requested accesses for said particular document within each department within said electronically readable organization chart.

16. The DRM System of claim 1, wherein said controller identifies, summarizes and tracks each said requested access in terms of locations identified within said electronically readable organization chart.

17. The DRM System of claim 1, wherein said controller identifies, summarizes and tracks each said requested access in terms of positions and titles within said electronically readable organization chart.

18. The DRM System of claim 1, wherein said display device displays said organizational chart of said defined organization, and data on requested accesses for said each document of said accessible documents.

19. The DRM System of claim 1, wherein said organization chart information includes organizational levels further including department levels, group levels within said department levels, and an individual's level.

20. The DRM System of claim 1, wherein said organization chart information includes title information for each department and group leader position.

21. The DRM System of claim 7, wherein said metadata includes document title information.

22. The DRM System of claim 7, wherein said metadata includes document code information.

23. The DRM System of claim 7, wherein said metadata includes document authorship information.

24. The DRM System of claim 7, wherein said metadata includes date of authorship information.

25. The DRM System of claim 7, wherein said metadata includes information on date of document reposition.

26. The DRM System of claim 19, wherein said organizational chart includes data at each department and at each group level.

27. A computer-implemented method of managing documents and records in a document repository of an institution having a defined organization, the method comprising:
    maintaining, using a computer, an electronically readable organization chart and organizational chart information including information identifying individuals on said organization chart;
    maintaining, using said computer, an electronic document repository containing accessible documents;
    controlling, using said computer, requested access to each document of said accessible documents in said electronic document repository; and
    mapping, using said computer, to said organization chart and said organizational chart information, each said requested access to said each document of said accessible documents; and
    displaying a document usage summary chart history, using said computer, based on historical tracking of actual usage and treatment of each document by individuals and groups within said organization chart.

28. The method of claim 27, wherein maintaining said electronically readable organization chart and organizational chart information includes periodically updating, using said computer, said organizational chart information to reflect changes in any location, position and title information on individuals within said organization chart.

29. The method of claim 27, wherein maintaining said electronic document repository includes adding and subtracting documents and editing documents and document metadata, using said computer.

30. The method of claim 27, wherein maintaining said electronic document repository includes periodically updating document access pre-authorization based on changes in any location, position and title of individuals within said organization chart, using said computer.

* * * * *